UNITED STATES PATENT OFFICE.

URIAH R. CALKINS, OF CHEYENNE WELLS, COLORADO.

COMPOSITION OF MATTER FOR THE TREATMENT OF DISEASES OF COWS.

1,404,370.     Specification of Letters Patent.     Patented Jan. 24, 1922.

No Drawing.     Application filed March 25, 1919. Serial No. 284,987.

*To all whom it may concern:*

Be it known that I, URIAH R. CALKINS, a citizen of the United States of America, residing at Cheyenne Wells, county of Cheyenne, and State of Colorado, have invented a new and useful Composition of Matter for the Treatment of Diseases of Cows, of which the following is a specification.

My composition of matter is used for preventing contagious abortion in cows, and also as a cure for certain diseases in cows and also in bulls, especially where bulls have contracted this abortive disease from cows.

My composition of matter is a compounded composition that just before it is used is made into a liquid solution, and it consists of the following ingredients which are combined in the following proportions, and which are given a mixing and a compressing treatment as stated, viz:

Bi-carbonate of soda_____ 9 parts
Epsom salts or magnesium sulphate_____ 1 part.
Water sufficient to moisten the ingredients about_____ ¼ part.

These ingredients are to be thoroughly mingled by agitation and are then subjected to a tablet making and compressing treatment to form it into dissolvable tablets in which condition it is preferably made for use and convenience in distribution.

My compounded composition of matter is then ready to be used, and it is preferably made up into individual doses for individual cows that have this contagious abortive disease.

The individual doses for individual cows are prepared in the following manner:

At the time the cow is to be treated, take two tablets of my compounded composition of matter, and dissolve them in a quart of water, heated to 102 degrees F. which is the blood heat of the cow, the heated solution prevents a shock to the cow.

This watery liquid solution made from two of my tablets comprises a dose, and it is administered to the cow by injecting it into the vagina of the cow.

By the use of my above described composition of matter compounded as above described and made into doses as specified, cows that have contracted the prevailing contagious abortive disease that renders their productive faculties incapable of developing calves, are cured, and bulls that have contracted this contagious disease from cows are also cured of it, and both cows and bulls are restored to their normal reproductive functions.

At the present time stockmen are suffering serious losses from the ravages of this contagious abortive disease, but I am able to state that after about two years use of this composition among herds of cattle in Colorado, that a cure has been found for it, that is inexpensive to provide in tablet form and that can be easily made up and used by stockmen among their herds either by themselves or by a veterinary.

Furthermore the tablets will keep fresh for a long time without any of their component parts losing their strength. One pound of my composition above described is used to make sixty-four tablets. Thus each tablet contains about 74⅜ grains (apothecary weight) of the composition.

Having described my compounded composition of matter, what I claim and desire to secure by Letters Patent is:

1. A tablet for treatment of contagious abortion comprising a major portion of bi-carbonate of soda and a minor part of epsom salt.

2. A tablet for treatment of contagious abortion comprising approximately nine parts of bi-carbonate of soda and 1 part of epsom salt.

In testimony whereof I affix my signature in presence of two witnesses.

URIAH R. CALKINS.

Witnesses:
N. SCHULTZ,
H. SCHULTZ.